(12) United States Patent
Andrews et al.

(10) Patent No.: US 12,335,160 B2
(45) Date of Patent: Jun. 17, 2025

(54) SECURE DATA ROUTING WITH DYNAMIC PACKET SPOOFING

(71) Applicant: SCATR LLC, Sheridan, WY (US)

(72) Inventors: John G. Andrews, Cleveland Heights, OH (US); John P. Keyerleber, Richmond Heights, OH (US)

(73) Assignee: SCATR LLC, Sheridan, WY (US)

( * ) Notice: Subject to any disclaimer, the term of this patent is extended or adjusted under 35 U.S.C. 154(b) by 95 days.

(21) Appl. No.: 18/345,847

(22) Filed: Jun. 30, 2023

(65) Prior Publication Data

US 2025/0007852 A1    Jan. 2, 2025

(51) Int. Cl.
*H04L 47/431*     (2022.01)
*H04L 9/40*     (2022.01)
(Continued)

(52) U.S. Cl.
CPC ............ *H04L 47/431* (2022.05); *H04L 45/24* (2013.01); *H04L 63/1483* (2013.01); *H04L 69/08* (2013.01)

(58) Field of Classification Search
CPC ... H04L 47/431; H04L 45/24; H04L 63/0471; H04L 63/1483; H04L 63/162;
(Continued)

(56) References Cited

U.S. PATENT DOCUMENTS

| | | |
|---|---|---|
| 6,502,135 B1 | 12/2002 | Munger et al. |
| 6,765,866 B1 | 7/2004 | Wyatt |

(Continued)

FOREIGN PATENT DOCUMENTS

| | | |
|---|---|---|
| CN | 112333152 A | 2/2021 |
| EP | 3651407 A1 | 5/2020 |

(Continued)

OTHER PUBLICATIONS

Notice of Allowance dated Jun. 22, 2021, U.S. Appl. No. 16/683,146, filed Nov. 13, 2019.

(Continued)

*Primary Examiner* — Kostas J Katsikis
(74) *Attorney, Agent, or Firm* — CONLEY ROSE, P.C.; Michael W. Piper; Elexis A. Jones

(57) ABSTRACT

A method of secure data routing with dynamic packet spoofing is disclosed that comprises a scatter network node receiving data packets from a user communication device and a scattering application selecting a logical communication channel from a plurality of logical communication channels. The method also comprises a channel controller receiving channel information that comprises a size limit corresponding to data packets being transmitted over the logical communication channel and modifying a received data packet based on the channel information such that a size of the modified data packet satisfies the size limit. The method additionally comprises a channel adapter wrapping the modified data packet to correspond to a particular protocol that is different than an initial protocol of the modified data packet. The method further comprises transmitting the modified data packet wrapped to correspond to the particular protocol via the logical communication channel to a counterpart scatter network device.

20 Claims, 5 Drawing Sheets

(51) Int. Cl.
*H04L 45/24* (2022.01)
*H04L 69/08* (2022.01)

(58) Field of Classification Search
CPC ..... H04L 63/166; H04L 63/168; H04L 69/08; H04L 63/164
See application file for complete search history.

(56) References Cited

U.S. PATENT DOCUMENTS

| | | |
|---|---|---|
| 6,990,111 B2 | 1/2006 | Lemoff et al. |
| 7,382,782 B1 | 6/2008 | Ferguson et al. |
| 7,697,528 B2 | 4/2010 | Parry et al. |
| 7,782,782 B1 | 8/2010 | Ferguson et al. |
| 7,895,348 B2 | 2/2011 | Twitchell, Jr. |
| 7,984,495 B1 | 7/2011 | Aravind |
| 8,274,980 B2 | 9/2012 | Sato et al. |
| 8,358,658 B2 | 1/2013 | Flynn et al. |
| 8,416,686 B2 | 4/2013 | Ferguson et al. |
| 8,924,716 B2 | 12/2014 | Miyabayashi et al. |
| 8,955,110 B1 | 2/2015 | Twitchell, Jr. |
| 9,116,734 B1 | 8/2015 | Twitchell, Jr. et al. |
| 9,185,046 B2 | 11/2015 | Ferguson et al. |
| 9,225,699 B2 | 12/2015 | Biradar et al. |
| 9,241,026 B2 | 1/2016 | Twitchell |
| 9,495,194 B1 | 11/2016 | Twitchell, Jr. et al. |
| 9,535,805 B2 | 1/2017 | Ananthanarayanan et al. |
| 9,629,063 B2 | 4/2017 | Brown et al. |
| 9,794,797 B2 | 10/2017 | Hoffberg |
| 10,356,061 B2 | 7/2019 | Fiske |
| 10,432,526 B2 | 10/2019 | Gafni et al. |
| 10,469,375 B2 | 11/2019 | Twitchell, Jr. |
| 10,541,907 B2 | 1/2020 | Twitchell, Jr. et al. |
| 10,637,685 B2 | 4/2020 | Goel et al. |
| 10,686,729 B2 | 6/2020 | Sindhu et al. |
| 10,826,711 B2 | 11/2020 | Barry |
| 10,826,876 B1* | 11/2020 | Sinn ................... H04L 63/162 |
| 10,833,972 B2 | 11/2020 | Vaughan et al. |
| 10,904,367 B2 | 1/2021 | Goel et al. |
| 10,965,586 B2 | 3/2021 | Goel et al. |
| 11,153,276 B1 | 10/2021 | Keyerleber |
| 11,171,934 B2 | 11/2021 | Fiske |
| 11,178,262 B2 | 11/2021 | Goel et al. |
| 11,184,147 B2 | 11/2021 | Ghorbani |
| 11,381,557 B2 | 7/2022 | Kim et al. |
| 11,469,922 B2 | 10/2022 | Goel et al. |
| 11,533,617 B2 | 12/2022 | Mihelich et al. |
| 11,558,422 B2 | 1/2023 | Twitchell, Jr. et al. |
| 11,601,359 B2 | 3/2023 | Goel et al. |
| 11,637,694 B2 | 4/2023 | Islamov |
| 11,777,839 B2 | 10/2023 | Sindhu et al. |
| 11,805,127 B1 | 10/2023 | Sundar et al. |
| 11,895,015 B1 | 2/2024 | Budhia et al. |
| 12,021,972 B2 | 6/2024 | Wang et al. |
| 12,120,028 B1 | 10/2024 | Andrews et al. |
| 2001/0050914 A1 | 12/2001 | Akahane et al. |
| 2001/0054158 A1 | 12/2001 | Jarosz |
| 2002/0191797 A1 | 12/2002 | Perlman |
| 2003/0112755 A1 | 6/2003 | McDysan |
| 2004/0103205 A1 | 5/2004 | Larson et al. |
| 2006/0008082 A1* | 1/2006 | Gluck ................... H04L 63/08 380/28 |
| 2007/0217424 A1* | 9/2007 | Kim ................... H04L 12/4675 370/392 |
| 2010/0149988 A1 | 6/2010 | Matsubara et al. |
| 2011/0179136 A1 | 7/2011 | Twitchell, Jr. |
| 2011/0271096 A1 | 11/2011 | Bharrat et al. |
| 2015/0326603 A1 | 11/2015 | Deisinger et al. |
| 2015/0350245 A1 | 12/2015 | Twitchell, Jr. et al. |
| 2015/0350246 A1* | 12/2015 | Bergman ............... H04L 63/02 726/14 |
| 2016/0065370 A1 | 3/2016 | Le Saint et al. |
| 2016/0255054 A1* | 9/2016 | Wan ................... H04L 45/74 713/160 |
| 2017/0019256 A1 | 1/2017 | Rhelimi |
| 2017/0126626 A1 | 5/2017 | Datta et al. |
| 2017/0331794 A1* | 11/2017 | Lokman ............... H04L 63/0428 |
| 2017/0372048 A1 | 12/2017 | Liu et al. |
| 2018/0316598 A1 | 11/2018 | Twitchell, Jr. |
| 2018/0375663 A1 | 12/2018 | Le Saint et al. |
| 2019/0014092 A1* | 1/2019 | Malek ................... H04L 45/745 |
| 2019/0294464 A1 | 9/2019 | Twitchell, Jr. et al. |
| 2019/0373458 A1* | 12/2019 | Dandekar ............. H04L 9/0891 |
| 2020/0014619 A1 | 1/2020 | Shelar et al. |
| 2020/0154272 A1 | 5/2020 | Uy et al. |
| 2020/0213111 A1 | 7/2020 | Leavy et al. |
| 2020/0213151 A1* | 7/2020 | Srivatsan ............. H04L 12/4641 |
| 2020/0259640 A1 | 8/2020 | Leavy et al. |
| 2021/0105301 A1* | 4/2021 | Anderson ........... H04L 63/0227 |
| 2021/0144004 A1 | 5/2021 | Gray et al. |
| 2021/0168138 A1* | 6/2021 | Paruchuri ........... H04L 63/0485 |
| 2021/0297351 A1 | 9/2021 | Vegesna et al. |
| 2021/0328779 A1 | 10/2021 | Ruan |
| 2021/0328976 A1 | 10/2021 | Leavy et al. |
| 2021/0360026 A1* | 11/2021 | Anderson ........... H04L 63/1466 |
| 2022/0247678 A1 | 8/2022 | Atwal et al. |
| 2022/0392286 A1 | 12/2022 | Elrad et al. |
| 2023/0097712 A1 | 3/2023 | Sullivan et al. |
| 2023/0164086 A1 | 5/2023 | York et al. |
| 2023/0198914 A1 | 6/2023 | Ranjan et al. |
| 2023/0208748 A1 | 6/2023 | Goel et al. |
| 2024/0007367 A1* | 1/2024 | Demchenko .......... H04L 47/245 |
| 2024/0028367 A1 | 1/2024 | Mathew et al. |
| 2024/0214803 A1* | 6/2024 | Dandekar ......... H04W 12/0431 |
| 2024/0380726 A1 | 11/2024 | Ban et al. |

FOREIGN PATENT DOCUMENTS

| | | |
|---|---|---|
| WO | 2018160863 A1 | 9/2018 |
| WO | 2023134844 A1 | 7/2023 |

OTHER PUBLICATIONS

Office Action dated Apr. 12, 2023, U.S. Appl. No. 17/481,914, filed Sep. 22, 2022.
Final Office Action dated Jul. 24, 2023, U.S. Appl. No. 17/481,914, filed Sep. 22, 2022.
Keyerleber, John P., et al., "Secure Data Routing and Randomization," filed Sep. 22, 2021, U.S. Appl. No. 17/481,914.
Andrews, John G., et al., "Secure Data Routing With Channel Resiliency," filed Mar. 31, 2023, U.S. Appl. No. 18/194,413.
Andrews, John G., et al., "Out of Band Key Exchange," filed Jun. 30, 2023, U.S. Appl. No. 18/345,819.
Andrews, John G., et al., "Network Traffic Obfuscation," filed Jun. 30, 2023, U.S. Appl. No. 18/345,829.
Andrews, John G., et al., "Endpoint Validation Security," filed Jun. 30, 2023, U.S. Appl. No. 18/345,837.
"Andrews, John G., et al., ""Secure Data Routing Andrandomization in Windows,"" filed Jul. 28, 2023, U.S. Appl. No. 18/361,721."
Notice of Allowance dated Jun. 11, 2024, U.S. Appl. No. 18/194,413, filed Mar. 31, 2023.
Office Action dated Nov. 27, 2024, U.S. Appl. No. 18/345,829, filed Jun. 30, 2023.
Syed, et al., "Zero Trust Architecture (ZTA): A Comprehensive Survey", IEEE Access—Digital Object Identifier, vol. 10, 37 pages, 2022.
Shu, et al., "Secure Data Collection in Wireless Sensor Networks Using Randomized Dispersive Routes", IEEE Transactions on Mobile Computing, vol. 9, No. 7, Jul. 2010, 14 pages.
Andrews, John G., et al., "Secure Data Routing With Channel Resiliency," filed Sep. 11, 2024, U.S. Appl. No. 11/882,552.
Advisory Action dated Oct. 5, 2023, U.S. Appl. No. 17/481,914, filed Sep. 22, 2022.
Examiner's Answer to Appeal Brief dated Feb. 23, 2024, U.S. Appl. No. 17/481,914, filed Sep. 22, 2022.
Office Action dated Feb. 13, 2024, U.S. Appl. No. 18/194,413, filed Mar. 31, 2023.
Keyerleber, John P., "Machine Learning Driven Network Traffic Obfuscation," filed Jan. 24, 2024, U.S. Appl. No. 18/421,960.

(56) References Cited

OTHER PUBLICATIONS

Keyerleber, et al., "Optimizing Network Traffic Obfuscation Based on Network Performance Using Reinforcement Learning," filed Jan. 24, 2024, U.S. Appl. No. 18/421,965.
Keyerleber, et al., "Optimizing Network Traffic Obfuscation Based on Aggregated Network Performance," filed Jan. 24, 2024, Application No. Jan. 24, 2024.
Office Action dated May 7, 2025, U.S. Appl. No. 18/345,819, filed Jun. 30, 2023.
Office Action dated Apr. 23, 2025, U.S. Appl. No. 18/361,721, filed Jul. 28, 2023.

* cited by examiner

SECURE DATA ROUTING WITH DYNAMIC PACKET SPOOFING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Data transmitted between two computing systems may travel via defined paths or routes, through any of a variety of publicly accessible networks (e.g., the Internet), and may use any of a variety of media, such as Ethernet or fiber cabling. In known methods of data transmission across networks, data routing is performed based on an external Internet protocol (IP) address. Data packets are generally forwarded across multiple routers to the requested IP address by the fastest path available at the time of transmission, with the packet's destination visible upon inspection.

Whenever data is moved between two points, there is a potential risk of unauthorized access to that data by an eavesdropper or other unauthorized actor. Conventional techniques to secure the transmission of confidential information typically rely upon data being encrypted by a sufficiently complex single encryption algorithm. For example, a virtual private network (VPN) establishes a virtual point-to-point connection (e.g., a so-called "secure tunnel") in which data is encrypted when it leaves one location and is decrypted at its destination, where both source and destination are identified by unique, attributable IP addresses. Any intermediate stops (hops) are also identifiable by their assigned IP address.

In the scenario above, two types of unauthorized users may attempt to access the transmitted data. First, an unauthorized user with access to an applicable encryption key (e.g., an employee of the source client that generated the data or a knowledgeable malicious actor) could observe the transmission and be able to decrypt and read the entirety of the communication. Next, an unauthorized user with no access to the applicable encryption key (e.g., an eavesdropper) may not be able to read the actual content of a communication, but may still be able to derive relevant information about the data transmission merely from observation, such as one or more of its destination, its source, its intermediate hops, the relative size (number of packets) of the transmission, the transmission type (e.g., based on destination port), and the like. Either of these bad actors could observe, capture, manipulate, divert, and/or log information about these types of transmissions. What is more, even with respect to an eavesdropper that does not have an encryption key, the actual content of a transmission may not be safe, as it is possible that a previously-accessed encrypted transmission may later become accessible. As computing resources improve, increasingly complex methods of encryption are subject to being "cracked" or broken, rendering such encryption useless. Once the encryption algorithm is broken, a hacker may be able to read unauthorized data that they previously obtained and stored.

SUMMARY

In an embodiment, a method of secure data routing with dynamic packet spoofing is disclosed. The method comprises receiving, by a scatter network node comprising at least one non-transitory memory and at least one processor, a plurality of data packets from a user communication device and selecting, by a scattering application stored in the at least one non-transitory memory and executable by the at least one processor, a logical communication channel of a plurality of logical communication channels. The method also comprises receiving, by a channel controller stored in the at least one non-transitory memory and executable by the at least one processor, channel information corresponding to the logical communication channel. The channel information comprises a size limit corresponding to data packets being transmitted over the logical communication channel. The method additionally comprises modifying, by the channel controller, a data packet of the plurality of data packets based on the channel information such that a size of the modified data packet satisfies the size limit, encrypting, by the scattering application, a portion of the modified data packet, and wrapping, by a channel adapter associated with the logical communication channel and stored in the at least one non-transitory memory and executable by the at least one processor, the modified data packet to correspond to a particular protocol that is different than an initial protocol of the modified data packet. Data packets being transmitted over the logical communication channel comprise the particular protocol. The method further comprises transmitting the modified data packet wrapped to correspond to the particular protocol via the logical communication channel to a counterpart scatter network device. The modified data packet wrapped to correspond to the particular protocol is obfuscated with other traffic on the logical communication channel.

In another embodiment, a scatter network device is disclosed. The scatter network device comprises at least one non-transitory memory, at least one physical interface, and at least one processor. The scatter network device also comprises a scattering application stored in the at least one non-transitory memory that, when executed by the at least one processor, establishes a plurality of logical channels and selects a logical communication channel of the plurality of logical communication channels to transmit a data packet received from a user communication device. The scatter network device additionally comprise a channel controller stored in the at least one non-transitory memory that, when executed by the at least one processor, receives channel information from the logical communication channel. The channel information comprises a size limit corresponding to data packets being transmitted over the logical communication channel. The channel controller, when executed by the at least one processor, modifies the data packet based on the channel information such that a size of the modified data packet satisfies the size limit. The modified data packet is transmitted via the logical communication channel to a counterpart scatter network device. The channel controller, when executed by the at least one processor, monitors an amount of traffic on the logical communication channel, disables the logical communication channel for a period of time in response to the amount of traffic on the logical communication channel exceeding a channel volume threshold, and transmits dummy packets that satisfy the size limit via the logical communication channel in response to the amount of traffic on the logical communication channel being less than the channel volume threshold.

In yet another embodiment, a method of secure data routing with dynamic packet spoofing is disclosed. The method comprises receiving, by a scatter network node comprising at least one non-transitory memory and executable by at least one processor, a plurality of data packets from a user communication device and selecting, by a scattering application stored in the at least one non-transitory memory and executable by the at least one processor, a first logical communication channel of a plurality of logical communication channels for transmitting a data packet of the plurality of data packets. The method also comprises wrapping, by a channel adapter associated with the first logical communication channel and stored in the at least one non-transitory memory and executable by the at least one processor, the data packet to correspond to a particular protocol that is different than an initial protocol of the data packet. Data packets being transmitted over the first logical communication channel comprise the particular protocol. The method additionally comprises transmitting the data packet wrapped to correspond to the particular protocol via the first logical communication channel to a counterpart scatter network device. The data packet wrapped to correspond to the particular protocol is obfuscated with other traffic on the first logical communication channel. The method further comprises monitoring, by a channel controller stored in the at least one non-transitory memory and executable by the at least one processor, an amount of traffic on each of the plurality of logical communication channels, disabling, by the channel controller, a second logical communication channel for a period of time in response to an amount of traffic on the second logical communication channel exceeding a channel volume threshold corresponding to the second logical communication channel, and transmitting, by the channel controller, dummy packets via a third logical communication channel in response to an amount of traffic on the third logical communication channel being less than a channel volume threshold corresponding to the third logical communication channel.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
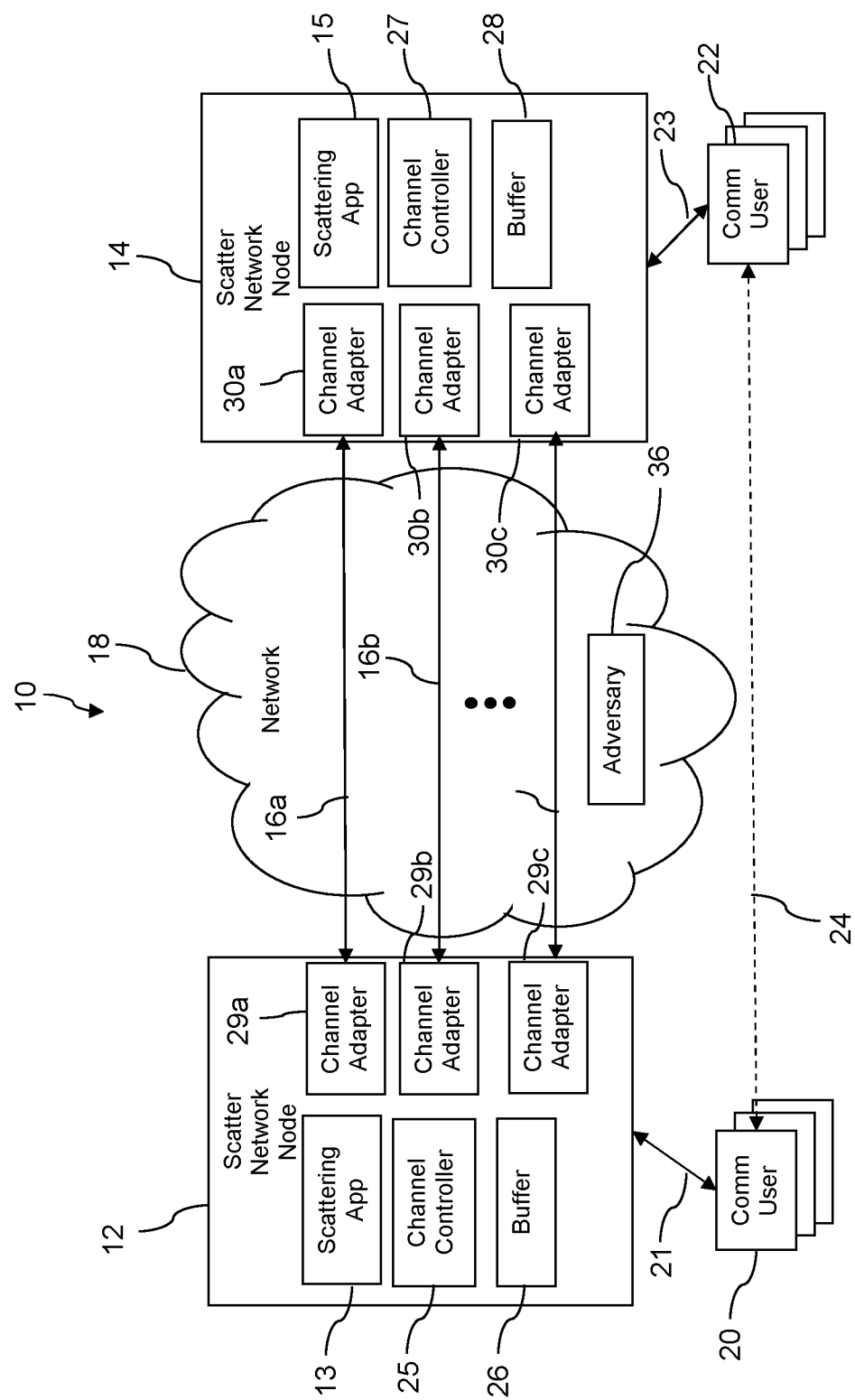
FIG. 1A is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

With any type of communication, there is a risk that an unauthorized party may attempt to access the transmitted data. To reduce the likelihood that an unauthorized party will attempt to access transmitted data, the pending disclosure is directed to dynamic packet spoofing or obfuscation. Specifically, the pending disclosure discusses different dynamic packet spoofing or obfuscation techniques used by a scatter network node when transmitting data packets via selected logical communication channels.

A first dynamic packet spoofing or obfuscation technique described herein involves packet size spoofing or obfuscation. Each logical communication channel may be associated with channel information that includes a size limit for data packets being transmitted via the logical communication channel. The size limit corresponds to the size of data packets being transmitted over the logical communication channel. A channel controller on the scatter network node receives the channel information corresponding to the selected logical communication channel and modifies a data packet to satisfy the size limit. Modification of the data packet to satisfy the size limit may include making the data packet larger by padding the data packet or making the data packet smaller by selecting only a portion of the data packet. Having the data packets transmitted via the selected logical communication channel meet the size limit helps reduce the likelihood of any one data packet being singled out or flagged by a potential adversary based on a size discrepancy with other data packets being transmitted via the selected logical communication channel. The size limit may be dynamically updated over time based on at least one of a time of day, day of the week, or a location associated with the communication user device that sent the data packet and/or the scatter network node. This dynamic updatability of the size limit enables more realistic data packet emulation, which helps to make data transmission more secure by lessening the chances of a potential adversary being able to flag or identify single data packets as anomalies.

A second dynamic packet spoofing or obfuscation technique described herein involves protocol spoofing or obfuscation. The logical communication channels may transmit data packets corresponding to particular protocols. A channel adapter on the scatter node and associated with a selected logical communication channel wraps a data packet to correspond to the particular protocol for the selected logical communication channel where the particular protocol is different than an initial protocol of the data packet. Wrapping the data packet to correspond with the particular protocol may include one or more of changing a first byte of the payload to correspond to the particular protocol, adding bytes present in the particular protocol, or adding a counter such that data packets being transmitted via the logical communication channel appear sequential. Having the data packets transmitted via the selected logical communication channel look like the particular protocol helps reduce the likelihood of any one data packet being singled out or flagged by a potential adversary based on a protocol discrepancy with other data packets being transmitted via the selected logical communication channel. The particular protocol may be dynamically updated over time based on at least one of a time of day, day of the week, or a location associated with the communication user device that sent the data packet and/or the scatter network node. This dynamic updatability of the particular protocol enables more realistic data packet emulation, which helps to make data transmission more secure by lessening the chances of a potential adversary being able to flag or identify single data packets as anomalies.

A third dynamic packet spoofing or obfuscation technique described herein involves volume spoofing or obfuscation. The channel controller on the scatter network node monitors the amount or volume of traffic on each of the logical communication channels. Each of the logical communication channels may be associated with a channel volume threshold. The channel controller is tasked with keeping the volume of traffic on each of the logical communication channels within the bounds of that channel volume threshold. For example, if the amount of traffic on one of the logical communication channels exceeding the channel volume threshold for that logical communication channel, the channel controller disables the logical communication channel for a period of time. In contrast, if the amount of traffic on one of the logical communication channels is less than the channel volume threshold for that logical communication channel, the channel controller transmits dummy packets via the logical communication channel such that the volume of traffic on the logical communication channel is within the bounds of the channel volume threshold. If this technique is being used in combination with the packet size spoofing or obfuscation technique, the size of the dummy packets transmitted will satisfy the size limit for the logical communication channel. If this technique is being used in combination with the protocol spoofing or obfuscation technique, the dummy packets transmitted will be wrapped to correspond to the particular protocol of the logical communication channel. Maintaining consistent traffic volume within the logical communication channels helps reduce the likelihood that any one logical communication channel will be singled out or flagged by a potential adversary. The channel volume threshold may be dynamically updated over time based on at least one of a time of day, day of the week, or a location the communication user device and/or the scatter network node. This dynamic updatability of the channel volume threshold enables more realistic traffic emulation, which helps to make data transmission more secure by lessening the chances of a potential adversary being able to flag or identify anomalies with the logical communication channels.

The above different types of dynamic packet spoofing or obfuscation techniques may be used individually or in combination by the scatter network node to have the data packets emulate other traffic being transmitted via the selected logical communication channel. This emulation helps reduce the likelihood of a data packet or logical communication channel being flagged as an anomaly by a potential adversary, which enables more secure data routing.

Turning now to FIG. 1A, a communication system 10 is described. In an embodiment, the system 10 comprises a first scatter network node 12 that executes a first scattering application 13 and a second scatter network node 14 that executes a second scattering application 15. In an embodiment, the first scattering application 13 is a first instance and the second scattering application 15 is a second instance of the same scattering application. In another embodiment, however, the first scattering application 13 may be different from the second scattering application 15, for example the first scattering application 13 may be configured to play a client role while the second scattering application 15 may be configured to play a server role.

The scatter network node 12 and the scatter network node 14 may each be implemented as separate computer systems, for example server computers. Computer systems are described further hereinafter. One or both of the scatter network nodes 12, 14 may be implemented as a smart phone, a wearable computer, a headset computer, a laptop computer, a tablet computer, or a notebook computer. One of the scatter network nodes 12, 14 may be implemented as one or more virtual servers executing in a cloud computing environment.

The scattering applications 13, 15 comprise executable logic instructions that comprise scripts, compiled high-level language code, assembly language instructions, and/or interpreted language code. The scattering applications 13, 15 may be provided as shell scripts, complied C language code, compiled C++ language code, JAVA code, and/or some other kind of logic instructions. In an embodiment, compiled C language code is used to implement the logic instructions of the scattering applications 13, 15 and provides access to powerful operating system calls and greater control of the operations on the scatter network nodes 12, 14 than scripts may provide. The scattering applications 13, 15 may also comprise data such as configuration data and/or provisioning data, for example provisioning data that defines logical communication channels and associations of user devices to logical communication channels.

In an embodiment, the scatter network nodes 12, 14 collaborate with each other to establish a plurality of logical communication channels 16 by which they communicate with each other via a network 18. The network 18 may comprise one or more private networks, one or more public networks, or a combination thereof. In an embodiment, the network 18 comprises the Internet. FIG. 1A shows a first logical communication channel 16a, a second logical communication channel 16b, and a third logical communication channel 16c, but it is understood that the scatter network nodes 12, 14 may establish any number of logical communication channels 16, for example 2, 3, 4, 5, 6, 7, 8, 9, 10, 15, 16, 20, 25, 27, 30, 32, 64, 138, 256, 1024, 4096, or some other number of logical communication channels 16 less than 2 million logical communication channels.

Each logical communication channel 16 may comprise a data communication link that may be considered as an IP communication path. Each logical communication channel 16 is bidirectional: data packets may flow from the first scatter network node 12 to the second scatter network node 14 via the logical communication channels 16; and data packets may flow from the second scatter network node 14 to the first scatter network node 12 via the logical communication channels 16. Each logical communication channel 16 may pass through various network nodes within the network 18. Some of the network nodes that the logical communication channels 16 pass through may include simple scatter relays and/or advanced scatter relays. The data communication passing from the first scatter network node 12 to the second scatter network node 14 or vice versa from the second scatter network node 14 to the first scatter network node 12 is treated within the network 18 as IP datagrams.

In an embodiment, the communication between the first scatter network node 12 and the second scatter network node 14 is encrypted. For example, a data portion of an application datagram encapsulated in a data portion of the IP datagrams may be encrypted. For example, a data portion of an application datagram and selected parts of a header portion of the application datagram encapsulated in the data portion of the IP datagrams may be encrypted. In some embodiments, the encryption may cause the encrypted portions of the communication to take on a pseudorandom appearance such that the encrypted portions of the communication may be indistinguishable from random noise. In some embodiments, the encryption may cause the encrypted portions of the communication to become, or be formatted as, a padded uniform random blob (PURB). A payload of the communication may be implemented as a PURB. Implementing the payload of the communication as a PURB may render metadata data of the communication indiscernible from payload data of the communication without decryption. Further, implementing the payload of the communication as a PURB will facilitate wrapping the data packet to correspond with a particular protocol, as described elsewhere herein.

In an embodiment, the communication between the first scatter network node 12 and the second scatter network node 14 may be considered to flow over a virtual private network (VPN). In some contexts, the scatter network nodes 12, 14 may be said to establish a scatter network via the logical communication channels 16.

A first communication user device 20 may establish a first local communication link 21 with the first scatter network node 12. A second communication user device 22 may establish a second local communication link 23 with the second scatter network node 14. The communication user devices 20, 22 may desire to communicate with each other via an application layer link 24 that is implemented via the scatter network nodes 12, 14 that provide network layer communication links (IP datagram traffic) via the network 18. Note that the dotted line 24 indicates that the application layer link is conceptual in nature and that the actual communication path between the communication user devices 20, 22 passes through the scatter network nodes 12, 14 and the network 18. The first and second local communication links may be insecure and may not carry encrypted data packets. For example, the IP datagrams sent by the first communication user device 20 may designate the true IP address of the first communication user device 20, and the IP datagrams sent by the second communication user device 22 may designate the true IP address of the second communication user device 22. It is undesirable to send IP datagrams that include the true IP addresses of communication user devices 20, 22 via the network 18 because an adversary system 36 may be sniffing or otherwise monitoring the data traffic in the network 18 and identify these user devices 20, 22. The scatter network nodes 12, 14 hide the true IP addresses of the communication user devices 20, 22.

In an embodiment, in addition to the first scattering application 13, the first scatter network node 12 executes a first channel controller 25 and first channel adapters 29. There may be a different channel adapter 29 associated with each logical communication channel 16. For example, the first scatter network node 12 may comprise a first channel adapter 29a associated with the first logical communication channel 16a, a second channel adapter 29b associated with the second logical communication channel 16b, and a third channel adapter 29c associated with third logical communication channel 16c. While only three channel adapters 29 are illustrated as executing on the scatter network node 12, any number of channel adapters 29 may be present without departing from the spirit or scope of the present disclosure. In some embodiments, there may be only one channel adapter 29 on the first scatter network node 12 associated with all of the logical communication channels 16. While represented as individual components, in some embodiments, the functionality of two or more of the first scattering application 13, the first channel controller 25, and/or the first channel adapters 29 may reside within a combined component executing on the first scatter network node 12. The first scatter network node 12 may also comprise a first buffer 26.

In an embodiment, in addition to the second scattering application 15, the second scatter network node 14 executes a second channel controller 27 and second channel adapters 30. There may be a different channel adapter 30 associated with each logical communication channel 16. For example, the second scatter network node 14 may comprise a first channel adapter 30a associated with the first logical communication channel 16a, a second channel adapter 30b associated with the second logical communication channel 16b, and a third channel adapter 30c associated with third logical communication channel 16c. While only three channel adapters 30 are illustrated as executing on the scatter network node 14, any number of channel adapters 30 may be present without departing from the spirit or scope of the present disclosure. In some embodiments, there may be only one channel adapter 30 on the second scatter network node 14 associated with all of the logical communication channels 16. While represented as individual components, in some embodiments, the functionality of two or more of the second scattering application 15, the second channel controller 27, and/or the second channel adapters 30 may reside within a combined component executing on the second scatter network node 14. The second scatter network node 14 may also comprise a second buffer 28.

The scatter network nodes 12, 14 may receive data packets from communication user devices 20, 22. For example, the first scatter network node 12 may receive data packets from the first communication user device 20 and the second scatter network node 14 may receive data packets from the second communication user device 15. The data packets received by the first scatter network node 12 may be stored in the first buffer 26. The data packets received by the second scatter network node 14 may be stored in the second buffer 28.

The scattering application 13, 15 may select one of the logical communication channels 16 for transmission of a received data packet. The scattering application 13, 15 may randomly select one of the logical communication channels 16. In an embodiment, the scattering application 13, 15 notifies the channel controller 25, 27 of the selected logical communication channel 16.

After a logical communication channel 16 is selected, the channel controller 25, 27 may request and receive channel information corresponding to the selected logical communication channel 16. For instance, if the scattering application 13, 15 selects the second logical communication channel 16b, the channel controller 25, 27 may request and receive channel information corresponding to the second logical communication channel 16b. In some embodiments, the channel information may be received from the selected logical communication channel 16. In some embodiments, the channel information may be received from the channel adapter 29, 30 associated with the selected logical communication channel 16.

The channel information may comprise a size limit corresponding to data packets being transmitted over the selected logical communication channel 16. The size limit may comprise a single value or a range. The range may comprise greater than x, less than y, between a and b, or some other range. Having the data packets transmitted via the selected logical communication channel 16 meet the size limit helps reduce the likelihood of any one data packet being singled out or flagged by a potential adversary based on a size discrepancy with other data packets being transmitted via the selected logical communication channel 16. The channel information including the size limit for a particular logical communication channel 16 may be stored with the corresponding channel adapter 29, 30. The channel information including the size limit may be updated periodically. In an embodiment, the channel information including the size limit is dynamically updated over time based on at least one of a time of day, day of the week, a location associated with the communication user device 20, 22 and/or the scatter network node 12, 14, or some other factor.

The channel controller 25, 27 may modify the data packet based on the channel information such that a size of the modified data packet satisfies the size limit for the selected logical communication channel 16. In an embodiment, modifying the data packet to satisfy the size limit comprises making the data packet larger by padding the data packet. In a non-limiting example, if the size of the data packet is 300 bytes and the size limit for the selected logical communication channel 16 is at least 500 bytes, the channel controller 25, 27 may pad the data packet until it is at least 500 bytes.

In an embodiment, modifying the data packet to satisfy the size limit comprises making the data packet smaller by selecting only a portion of the data packet. As one non-limiting example, if the size of the data packet is 1400 bytes and the size limit for the selected logical communication channel 16 is no more than 200 bytes, the channel controller 25, 27 selects 200 bytes (or less) of the data packet for transmission via the selected logical communication channel 16. The remaining non-selected portion of the data packet may be stored in the buffer 26, 28 and processed for transmission as described herein. For instance, the scattering application 13, 15 may select a second one of the logical communication channels 16 for transmission of the remaining non-selected portion of the data packet and the channel controller 25, 27 may request and receive channel information corresponding to the second one of the logical communication channels 16. Continuing with the same example, if the size of the data packet is 1200 bytes (because 200 bytes was already transmitted via the initially selected logical communication channel 16) and the size limit for the second selected logical communication channel 16 is no more than 700 bytes, the channel controller 25, 27 selects 700 bytes (or less) of the remaining portion of the data packet for transmission via the second selected logical communication channel 16. This process may continue until there is no remaining portion of the data packet.

Once the modified data packet satisfies the size limit, a portion of the modified data packet may be encrypted. For example, the scattering application 13, 15 may encrypt a portion of the modified data packet. In some embodiments, the encryption may cause the encrypted portions of the communication to become, or be formatted as, a PURB, as described above.

In an embodiment, the channel adapter 29, 30 associated with the selected logical communication channel 16 wraps the modified data packet to correspond to a particular protocol that is different than an initial protocol of the modified data packet. Data packets being transmitted over the logical communication channel may comprise the particular protocol. Having the data packets transmitted via the selected logical communication channel 16 look like the particular protocol helps reduce the likelihood of any one data packet being singled out or flagged by a potential adversary based on a protocol discrepancy with other data packets being transmitted via the selected logical communication channel 16. The particular protocol may be stored with the corresponding channel adapter 29, 30. The particular protocol may be updated periodically. In an embodiment, the particular protocol is dynamically updated over time based on at least one of a time of day, day of the week, a location associated with the communication user device 20, 22 and/or the scatter network node 12, 14, or some other factor.

In an embodiment, wrapping the modified data packet to correspond with the particular protocol comprises one or more of changing a first byte of the payload to correspond to the particular protocol, adding bytes present in the particular protocol, adding a counter such that data packets being transmitted via the logical communication channel appear sequential, or some other modification to make the modified data packet look like it is the particular protocol. In an embodiment, the particular protocol is a protocol that uses a user datagram protocol (UDP) type. The particular protocol may comprise QUIC protocol, Real-time Transport Protocol (RTP), a video streaming protocol, a voice streaming protocol, or some other type of protocol. As one non-limiting example, if the particular protocol for the logical communication channel 16 is QUIC protocol, the corresponding channel adapter 29, 30 may modify the first byte of the payload to correspond to the QUIC protocol, add additional bytes for a connection identify that is present in the QUIC protocol, and/or add a counter such that the modified data packet wrapped to correspond to the QUIC protocol appears that it is the next data packet in the sequence of data packets being transmitted by the logical communication channel 16.

In an embodiment, wrapping the modified packet to correspond with the particular protocol does not change the encrypted portion of the modified packet. Specifically, wrapping the modified packet to correspond with the particular protocol may not change the PURB of the modified data packet. The modified data packet may be transmitted via the logical communication channel 16 to a counterpart scatter network device 12, 14. The scattering application 13, 15, the channel controller 25, 27, or one of the channel adapters 29, 30 may transmit the modified data packet via the logical communication channel 16 to the counterpart scatter network device 12, 14.

In addition to the size obfuscation and protocol obfuscation discussed above, the channel controller 25, 27 may implement volume obfuscation. In particular, the channel controller 25, 27 may monitor the amount or volume of traffic on the logical communication channels 16. Each of the logical communication channels 16 may be associated with a different channel volume threshold. The channel volume threshold may be a single value or a range. The channel volume threshold may be stored with the corresponding channel adapter 29, 30 or in a different location. The channel volume threshold may be updated periodically. In an embodiment, the channel volume threshold is dynamically updated over time based on at least one of a time of day, day of the week, a location associated with the communication user device 20, 22 and/or the scatter network node 12, 14, or some other factor. For example, for one or more logical communication channels 16, the channel volume threshold may be greater in the morning than it is late at night.

In an embodiment, in response to the amount of traffic on the logical communication channel 16 exceeding the corresponding channel volume threshold, the channel controller 25, 27 disables the logical communication channel 16 for a period of time. In one non-limiting example where data packages are being wrapped to correspond to a Voice over Internet Protocol (VoIP) exchange, for the VoIP exchange to look legitimate, there would need to be periods of no data packets being transmitted via the logical communication channel while a user is presumed to be done talking and is instead listening. In such an example, the corresponding channel volume threshold may be a VOIP threshold, and if the logical communication channel 16 is hitting and/or exceeding that VOIP threshold, the channel controller 25, 27 may disable the logical communication channel 16 for a period of time (e.g., 300 milliseconds).

In an embodiment, in response to the amount of traffic on the logical communication channel 16 being less than the channel volume threshold, the channel controller 25, 27 transmits dummy packets via the logical communication channel 16 to meet the channel volume threshold. The dummy packets transmitted via the logical communication channel 16 may satisfy the size limit for the logical communication channel 16. The dummy packets transmitted via the logical communication channel 16 may be wrapped in the particular protocol corresponding to the logical communication channel. If the channel volume threshold is a range, the channel controller 25, 27 may randomly select a volume of dummy packets within the range to send via the logical communication channel 16.

Figure 1B:
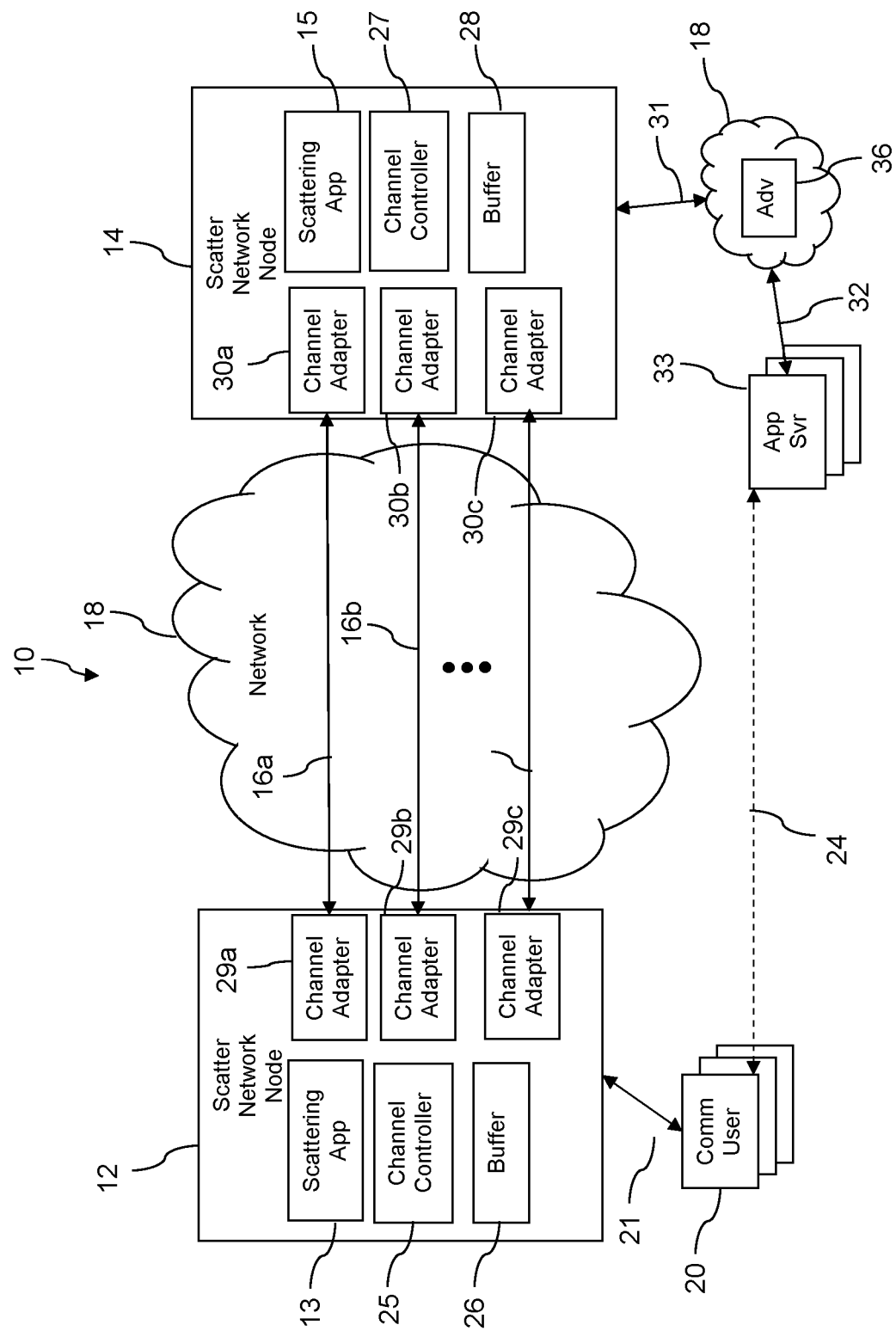
FIG. 1B is another block diagram of the communication system according to an embodiment of the disclosure.

Turning now to FIG. 1B, an alternate view of the communication system 10 is described. The communication functionality provided by the scatter network nodes 12, 14 is general and applies to other communication scenarios than that illustrated and described with reference to FIG. 1A. Note that the network 18 is shown as two cloud images in FIG. 1B but these two clouds conceptually refer to the same network. It is illustrated in FIG. 1B to facilitate understanding of flow of communications. In FIG. 1B, the communicating end users may be considered to be the first communication user device 20 and an application server 33. Thus, the first communication user device 20 may communicate with the application server 33 via an application layer communication link 24 that is conceptual in nature. The first communication user device 20 may request content from and receive content from the application server 33 or send content to the application server 33 conceptually over the application layer communication link 24 but in fact via the first communication link 21, via the logical communication channels 16, via a third communication link 31 to the network 18, and from the network 18 via a fourth communication link 32 to the application server 33. It will be appreciated that the network 18 through which the logical communication channels 16 route is the same network 18 through which the second scatter network node 14 communicates with the application server 29 via communication links 31, 32, drawn separately here to support further understanding of the system 10.

As illustrated in FIG. 1B, the adversary 36 may be located so as to monitor communication between the network 18 and the application server 33. The adversary 36 may determine the true IP addresses of a communication port of the second scatter network node 14 and a communication port of the application server 33. Importantly, however, the adversary 36 is not able to determine the true IP address of the first scatter network node 12 or of the first communication user device 20, hence the adversary 36 is not readily able to determine an approximate location of the first communication user device 20 and/or of the first scatter network node 12.

With reference now to both FIG. 1A and FIG. 1B, the first logical communication channel 16a may be considered to be defined by an IP address and port number at the first scatter network node 12 and an IP address and port number at the second scatter network node 14. The term port number or port numbers refers to a transport communication layer port number or transport communication layer port numbers and may include well-known port numbers. In an embodiment, the first scatter network node 12 and or the first scattering application 13 may define sockets to establish the communication ports at its end of the logical communication channels 16, and the second scatter network node 14 and/or the second scattering application 15 may define coordinate sockets to establish the communication ports at its end of the logical communication channels 16. Sockets are a well-known communication abstraction used for conducting data communication between computer systems over the Internet. In an embodiment, the sockets may be user datagram protocol (UDP) type sockets. In an embodiment, the sockets may be transmission control protocol (TCP) type sockets. In an embodiment, a different intermachine communication abstraction may be used to implement the logical communication channels 16.

The first logical communication channel 16a is bidirectional: in a first communication event, the first scatter network node 12 may send an IP datagram via the first logical communication channel 16a to the second scatter network node 14 via the network 18, while in a second communication event, the second scatter network node 14 may send an IP datagram via the first logical communication channel 16a to the first scatter network node 12 via the network 18. The different logical communication channels 16 connect to the first scatter network node 12 at a different combinations of IP address, protocol, and port. For example, the first logical communication channel 16a may connect to the first scatter network node 12 at a first IP address and first port number; the second logical communication channel 16b may connect to the first scatter network node 12 at a second IP address and the first port number; and the third logical communication channel 16c may connect to the first scatter network node 12 at a third IP address and the first port number.

Alternatively, the first logical communication channel 16a may connect to the first scatter network node 12 at a first IP address and first port number; the second logical communication channel 16b may connect to the first scatter network node 12 at the first IP address and a second port number; and the third logical communication channel 16c may connect to the first scatter network node 12 at the first IP address and a third port number. Alternatively, the first logical communication channel 16a may connect to the first scatter network node 12 at a first IP address and first port number; the second logical communication channel 16b may connect to the first scatter network node 12 at a second IP address and the first port number; and the third logical communication channel 16c may connect to the first scatter network node 12 at a third IP address and a second port number. The logical communication channels 16 may attach to the second scatter network node 14 by other combinations of IP address/port number pairs, IP protocols, or the like.

It is noted that a logical communication channel 16 may be defined by any unique combination of (A) an IP address associated with the first scatter network node 12, (B) a port number at the first scatter network node 12, (C) an IP address associated with the second scatter network node, (D) a port number at the second scatter network node, and (E) the IP protocol used between the first scatter network node 12 and the second scatter network node 14. Thus, the first logical channel 16a could be defined by a first IP address associated with the first scatter network node 12, a first port number at the first scatter network node 12, a second IP address associated with the second scatter network node 14, and a second port number at the second scatter network node; the second logical channel 16b could be defined by the first IP address associated with the first scatter network node 12, the first port number at the first scatter network node 12, a third IP address associated with the second scatter network node 14, and the second port number at the second scatter network node; and the third logical channel 16c could be defined by the first IP address associated with the first scatter network node 12, the first port number at the first scatter network node 12, the second IP address associated with the second scatter network node 14, and a third port number at the second scatter network node. These are examples of unique IP addresses and port numbers that uniquely define logical communication channels 16, but it is understood there are many alternative combinations.

Figure 2:
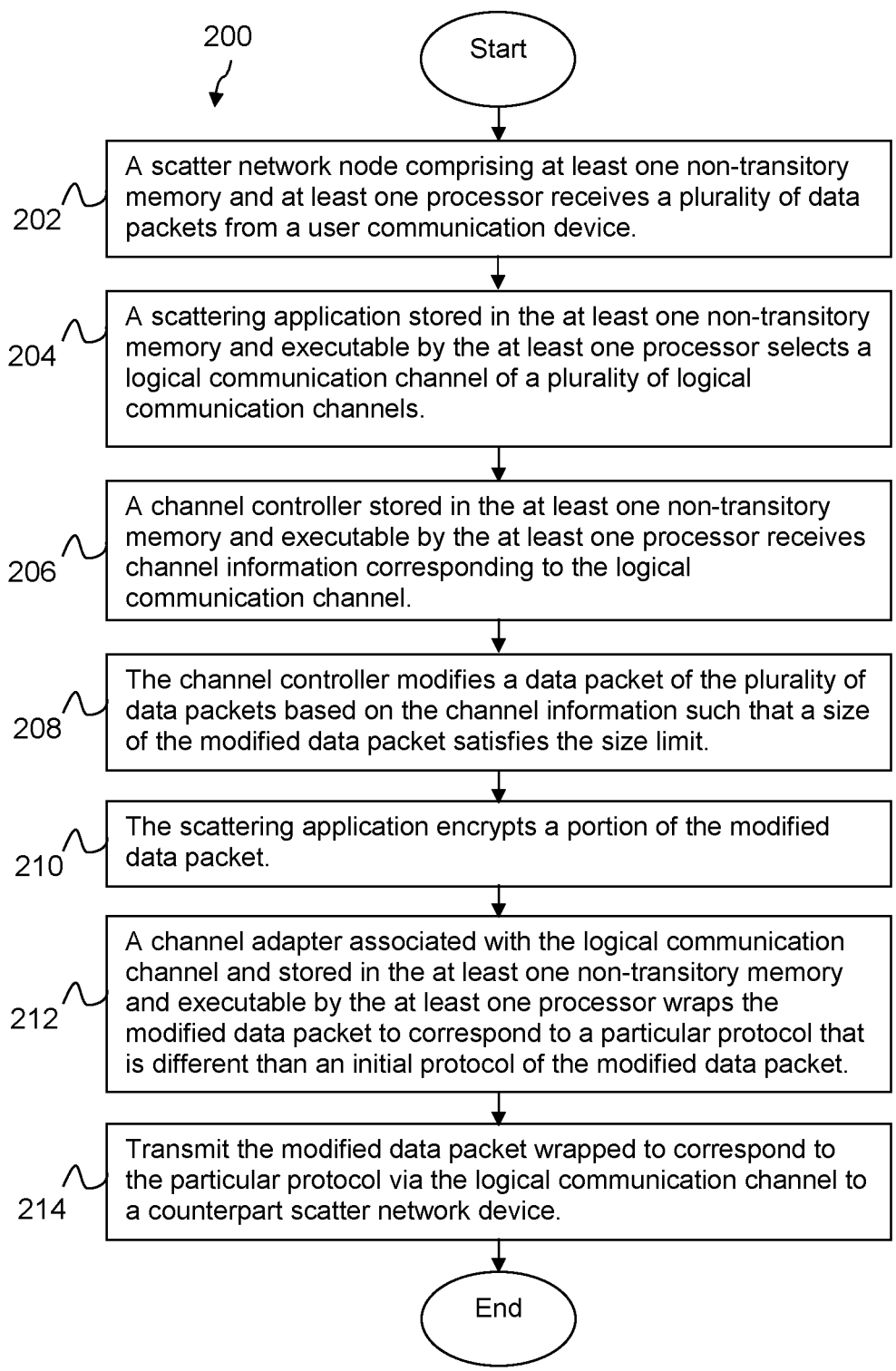
FIG. 2 is a flow chart of a method according to an embodiment of the disclosure.

Turning now to FIG. 2, a method 200 is described. In an embodiment, the method 200 is a method of secure data routing with packet spoofing. At block 202, a scatter network node (e.g., scatter node 12, 14) comprising a non-transitory memory and a processor receives a plurality of data packets from a user communication device (e.g., communication user device 20, 22). At block 204, a scattering application (e.g., scattering application 13, 15) stored in a non-transitory memory and executable by a processor selects a logical communication channel (e.g., logical communication channel 16a, 16b, 16c) of a plurality of logical communication channels (e.g., logical communication channels 16). At block 206, a channel controller (e.g., channel controller 25, 27) stored in a non-transitory memory and executable by a processor receives channel information corresponding to the logical communication channel.

At block 208, the channel controller modifies a data packet of the plurality of data packets based on the channel information such that a size of the modified data packet satisfies the size limit. At block 210, the scattering application encrypts a portion of the modified data packet. At block 212, a channel adapter (e.g., channel adapter 29, 30) associated with the logical communication channel and stored in a non-transitory memory and executable by a processor wraps the modified data packets to correspond to a particular protocol that is different than an initial protocol of the modified data packet. At block 214, the modified data packet wrapped to correspond to the particular protocol is transmitted via the logical communication channel to a counterpart scatter network device (e.g., scatter network node 12, 14).

Figure 3:
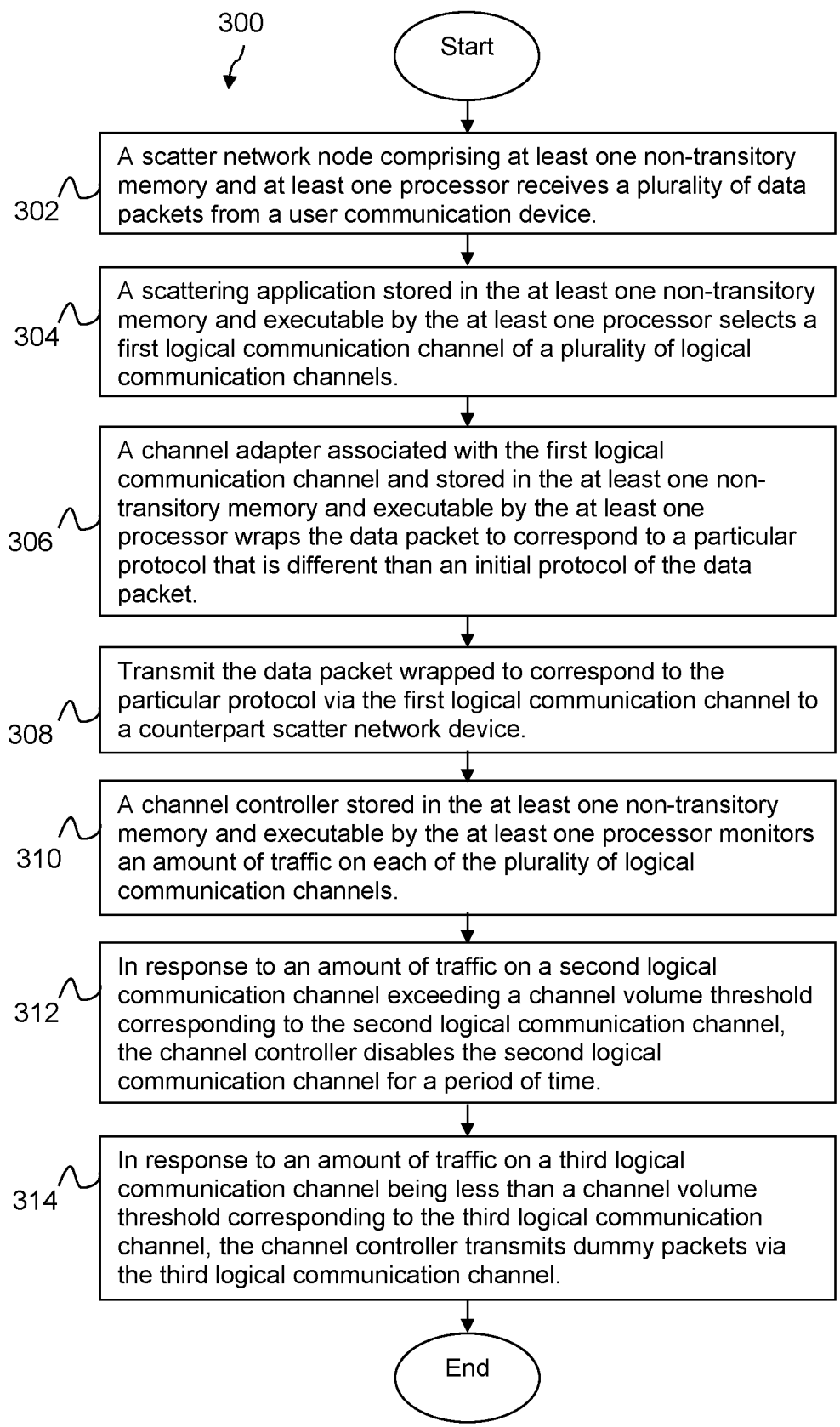
FIG. 3 is a flowchart of a method according to an embodiment of the disclosure.

Turning now to FIG. 3, a method 300 is described. In an embodiment, the method 300 is a method of secure data routing with packet spoofing. At block 302, a scatter network node (e.g., scatter node 12, 14) comprising a non-transitory memory and a processor receives a plurality of data packets from a user communication device (e.g., communication user device 20, 22). At block 304, a scattering application (e.g., scattering application 13, 15) stored in a non-transitory memory and executable by a processor selects a first logical communication channel (e.g., logical communication channel 16a, 16b, 16c) of a plurality of logical communication channels (e.g., logical communication channels 16). At block 306, a channel adapter (e.g., channel adapter 29, 30) stored in a non-transitory memory and executable by a processor wraps the data packet to correspond to a particular protocol that is different than an initial protocol of the data packet.

At block 308, the data packet wrapped to correspond to the particular protocol is transmitted via the first logical communication channel to a counterpart scatter network device (12, 14). At block 310, a channel controller (e.g., channel controller 25, 27) stored in a non-transitory memory and executable by a processor monitors an amount of traffic on each of the plurality of logical communication channels. At block 312, in response to an amount of traffic on a second logical communication channel (e.g., logical communication channel 16a, 16b, 16c) exceeding a channel volume threshold corresponding to the second logical communication channel, the channel controller disables the second logical channel for a period of time. At block 314, in response to an amount of traffic on a third logical communication channel (e.g., logical communication channel 16a, 16b, 16c) being less than a channel volume threshold corresponding to the third logical communication, the channel controller transmits dummy packets via the third logical communication channel.

Figure 4:
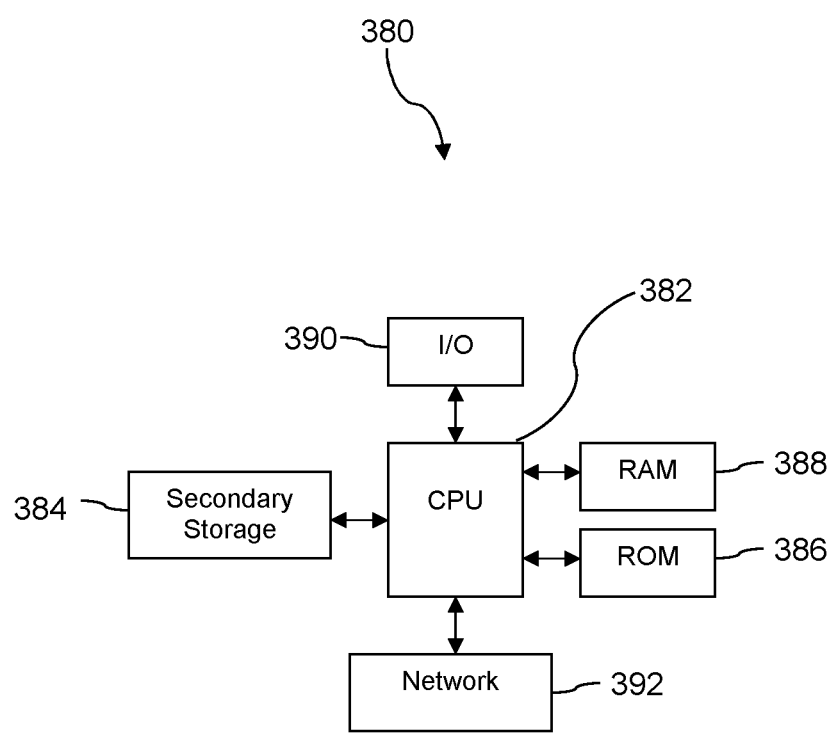
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may be referred to as physical interfaces or physical network interfaces. The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards such as a WiFi physical interface, radio transceiver cards such as a wireless wide area network (WWAN) such as a cellular network physical interface, and/or other well-known network devices. A network connectivity device 392 may comprise an Ethernet-to-satellite wireless link physical interface. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of secure data routing with dynamic packet spoofing, comprising:
    receiving, by a scatter network node comprising at least one non-transitory memory and at least one processor, a plurality of data packets from a user communication device;
    selecting, by a scattering application stored in the at least one non-transitory memory and executable by the at least one processor, a logical communication channel of a plurality of logical communication channels;
    receiving, by a channel controller stored in the at least one non-transitory memory and executable by the at least one processor, channel information corresponding to the logical communication channel, wherein the channel information comprises a size limit corresponding to data packets being transmitted over the logical communication channel;
    modifying, by the channel controller, a data packet of the plurality of data packets based on the channel information such that a size of the modified data packet satisfies the size limit;
    encrypting, by the scattering application, a portion of the modified data packet;
    wrapping, by a channel adapter associated with the logical communication channel and stored in the at least one non-transitory memory and executable by the at least one processor, the modified data packet to correspond to a particular protocol that is different than an initial protocol of the modified data packet, wherein data packets being transmitted over the logical communication channel comprise the particular protocol; and
    transmitting the modified data packet wrapped to correspond to the particular protocol via the logical communication channel to a counterpart scatter network device, wherein the modified data packet wrapped to correspond to the particular protocol is obfuscated with other traffic on the logical communication channel.

2. The method of claim 1, wherein the size limit is dynamically updated over time based on at least one of a time of day, day of the week, or a location.

3. The method of claim 1, wherein modifying the data packet to satisfy the size limit comprises making the data packet larger by padding the data packet or making the data packet smaller by selecting only a portion of the data packet.

4. The method of claim 1, wherein the plurality of data packets are stored in a buffer.

5. The method of claim 1, wherein the particular protocol is dynamically updated based on at least one of a time of day, day of the week, or a location.

6. The method of claim 1, wherein wrapping the modified data packet to correspond with the particular protocol comprises one or more of changing a first byte of the payload to correspond to the particular protocol, adding bytes present in the particular protocol, or adding a counter such that data packets being transmitted via the logical communication channel appear sequential.

7. The method of claim 1, wherein wrapping the modified data packet to correspond with the particular protocol does not change the encrypted port of the modified data packet.

8. A scatter network device, comprising:
at least one non-transitory memory;
at least one physical interface;
at least one processor;
a scattering application stored in the at least one non-transitory memory that, when executed by the at least one processor:
establishes a plurality of logical channels, and
selects a logical communication channel of the plurality of logical communication channels to transmit a data packet received from a user communication device; and
a channel controller stored in the at least one non-transitory memory that, when executed by the at least one processor:
receives channel information from the logical communication channel, wherein the channel information comprises a size limit corresponding to data packets being transmitted over the logical communication channel,
modifies the data packet based on the channel information such that a size of the modified data packet satisfies the size limit, wherein the modified data packet is transmitted via the logical communication channel to a counterpart scatter network device,
monitors an amount of traffic on the logical communication channel,
in response to the amount of traffic on the logical communication channel exceeding a channel volume threshold, disables the logical communication channel for a period of time, and
in response to the amount of traffic on the logical communication channel being less than the channel volume threshold, transmits dummy packets that satisfy the size limit via the logical communication channel.

9. The scatter network device of claim 8, wherein the scattering application is further configured to encrypt a portion of the modified data packet prior to the modified data packet being transmitted via the logical communication channel.

10. The scatter network device of claim 8, wherein the channel volume threshold is dynamically updated based on at least one of a time of day, day of the week, or a location.

11. The scatter network device of claim 8, wherein the channel volume threshold comprises a range.

12. The scatter network device of claim 8, wherein the size limit is dynamically updated over time based on at least one of a time of day, day of the week, or a location.

13. The scatter network device of claim 8, wherein modifying the size of the data packet to satisfy the size limit comprises making the data packet larger by padding the data packet or making the data packet smaller by selecting only a portion of the data packet.

14. The scatter network device of claim 8, further comprising a buffer, wherein the data packet is stored in the buffer.

15. The scatter network device of claim 8, further comprising:
a channel adapter associated with the logical communication channel, the channel adapter stored in the at least one non-transitory memory that, when executed by the at least one processor:
wrap the modified data packet to correspond to a particular protocol that is different than an initial protocol of the modified data packet, wherein data packets being transmitted over the logical communication channel comprise the particular protocol, wherein the modified data packet wrapped to correspond to the particular protocol is transmitted via the logical communication channel to the counterpart scatter network device, and wherein the modified data packet wrapped to correspond to the particular protocol is obfuscated with other traffic on the logical communication channel.

16. A method of secure data routing with dynamic packet spoofing, comprising:
receiving, by a scatter network node comprising at least one non-transitory memory and at least one processor, a plurality of data packets from a user communication device;
selecting, by a scattering application stored in the at least one non-transitory memory and executable by the at least one processor, a first logical communication channel of a plurality of logical communication channels for transmitting a data packet of the plurality of data packets;
wrapping, by a channel adapter associated with the first logical communication channel and stored in the at least one non-transitory memory and executable by the at least one processor, the data packet to correspond to a particular protocol that is different than an initial protocol of the data packet, wherein data packets being transmitted over the first logical communication channel comprise the particular protocol;
transmitting the data packet wrapped to correspond to the particular protocol via the first logical communication channel to a counterpart scatter network device, wherein the data packet wrapped to correspond to the particular protocol is obfuscated with other traffic on the first logical communication channel;
monitoring, by a channel controller stored in the at least one non-transitory memory and executable by the at least one processor, an amount of traffic on each of the plurality of logical communication channels;
in response to an amount of traffic on a second logical communication channel exceeding a channel volume threshold corresponding to the second logical communication channel, disabling, by the channel controller, the second logical communication channel for a period of time; and
in response to an amount of traffic on a third logical communication channel being less than a channel volume threshold corresponding to the third logical communication channel, transmitting, by the channel controller, dummy packets via the third logical communication channel.

17. The method of claim 16, wherein the particular protocol is dynamically updated based on at least one of a time of day, day of the week, or a location.

18. The method of claim 16, wherein wrapping the data packet to correspond with the particular protocol comprises one or more of changing a first byte of the payload to correspond to the particular protocol, adding bytes present in the particular protocol, or adding a counter such that data packets being transmitted via the logical communication channel appear sequential.

19. The method of claim 16, further comprising:
receiving, by the channel controller, channel information from the first logical communication channel, wherein the channel information comprises a size limit corresponding to data packets being transmitted over the first logical communication channel;

modifying, by the channel controller, the data packet based on the channel information such that a size of the modified data packet satisfies the size limit; and encrypting, by the scattering application, a portion of the modified data packet, wherein the modifying and the encrypting occur before the wrapping.

20. The method of claim 19, wherein the size limit is dynamically updated over time based on at least one of a time of day, day of the week, or a location, and wherein modifying the size of the data packet to satisfy the size limit comprises making the data packet larger by padding the data packet or making the data packet smaller by selecting only a portion of the data packet.

* * * * *